United States Patent [19]

Kueppers et al.

[11] Patent Number: 5,693,243

[45] Date of Patent: Dec. 2, 1997

[54] METHOD AND APPARATUS FOR HEAT TREATMENT OF AN ELEMENT BY TREATMENT DEVICES ENGAGING THE ELEMENT ON BOTH SIDES

[75] Inventors: Frank Kueppers, Wegberg; Reiner Schlickhoff, Bergkamen, both of Germany

[73] Assignee: Minnesota Mining and Manufacturing Company, St. Paul, Minn.

[21] Appl. No.: 412,456

[22] Filed: Mar. 29, 1995

[30] Foreign Application Priority Data

May 9, 1994 [DE] Germany .......................... 44 16 157.3

[51] Int. Cl.$^6$ ........................................ H05B 1/02
[52] U.S. Cl. .................... 219/216; 335/290; 219/471
[58] Field of Search ............................. 219/216, 388, 219/469, 470, 471; 335/285, 289, 290; 156/253

[56] References Cited

U.S. PATENT DOCUMENTS

| | | | |
|---|---|---|---|
| 4,425,494 | 1/1984 | Enomoto et al. | 219/216 |
| 4,459,803 | 7/1984 | Ohno et al. | 355/14 FU |
| 4,609,278 | 9/1986 | Taniguchi | 355/3 FU |
| 4,905,051 | 2/1990 | Satoh | 355/290 |
| 4,920,250 | 4/1990 | Urban | 219/216 |
| 5,019,693 | 5/1991 | Tamary | 219/471 |
| 5,073,221 | 12/1991 | Waitts et al. | 156/253 |
| 5,111,249 | 5/1992 | Owada | 355/285 |
| 5,124,756 | 6/1992 | Stetler | 355/290 |
| 5,247,336 | 9/1993 | Mills, III | 355/285 |
| 5,303,016 | 4/1994 | Oda et al. | 355/289 |

FOREIGN PATENT DOCUMENTS

| | | |
|---|---|---|
| 295655 | 12/1988 | European Pat. Off. . |
| 0 402 143 | 12/1990 | European Pat. Off. . |
| 0 632 345 | 1/1995 | European Pat. Off. . |
| 2616 804 | 11/1976 | Germany . |
| 3517 085 | 11/1985 | Germany . |
| 3932963 | 4/1991 | Germany . |
| 4200608-A | 7/1993 | Germany . |
| 4-162078 | 6/1992 | Japan . |
| 1 482 403 | 8/1977 | United Kingdom . |
| 2 139 559 | 11/1984 | United Kingdom . |

*Primary Examiner*—Tu B. Hoang
*Attorney, Agent, or Firm*—Carolyn A. Bates; Kent J. Sieffert

[57] ABSTRACT

In the apparatus (10) and the method according to the invention, two temperature treatment devices (e.g., laminating rollers 14, 16) which are to be contacted with an element to be subjected to heat treatment (e.g., proof 50 with color particles 52), are temperature-controlled. One of the treatment devices (laminating roller 14) is provided with a heating means (22). For tempering the second treatment device (laminating roller 16), the second treatment device is brought into contact with the directly heated treatment device (laminating roller 14). This is carried out as soon as the temperature of the not directly heated treatment device (laminating roller 16) has dropped below a predetermined desired temperature or a predetermined desired temperature range. When the two treatment devices (laminating rollers 14,16) are in mutual contact, the directly heated treatment device (laminating roller 14) is heated to a higher temperature than when the two treatment devices (laminating rollers 14, 16) are spaced apart from each other.

8 Claims, 3 Drawing Sheets

METHOD AND APPARATUS FOR HEAT TREATMENT OF AN ELEMENT BY TREATMENT DEVICES ENGAGING THE ELEMENT ON BOTH SIDES

BACKGROUND OF THE INVENTION

1. Field of the Invention

The invention is directed to a method and an apparatus for heat treatment of an element by treatment devices engaging the element on both sides. Particularly, the invention is directed to a method and an apparatus for tempering the heatable laminate rollers of a laminating device, preferably in color proofing systems, said laminating device being preferably a laminating device with temperature-controlled laminate rollers.

2. Background of Art

In a wide range of treatment processes, an element to be subjected to heat treatment is brought into bilateral pressure contact with heatable treatment members, particularly pressure rollers. Examples of such processes are heater fixing stations in (electrophotographic) copying machines, in which the toner image is fixed on the copying sheet by "burning" the toner particles into the sheet. Another example for using the invention is a laminating device in which a film is laminated onto a carrier by heat and pressure. Such laminating devices are used, e.g., for color proofing systems in the field of graphic reproduction and printing, where the laminating device is used for laminating a layer attached on a carrier film and comprising a visible light absorbing composition such as color particles or the like, onto the proof (e.g., a sheet of paper material). The adhesive strength of the visible light absorbing composition on the proof and the homogeneity of the adhesion will depend not only on the pressure of the laminating rollers but also on the (absolute) temperature of the two laminating rollers and the stability of the temperature during the laminating process.

The heat treatment devices known from U.S. Pat. No. 4,425,494, U.S. Pat. No. 5,111,249, DE 42 00 608 A1, EP 0 295 655 B1 and JP-PS 4-162 078 comprise one pair of pressure rollers of which only one roller is heated and temperature-controlled by a heating means. Heat losses occurring while the rollers are in engagement with the element (e.g. a material sheet) to be subjected to heat treatment, are compensated by increasing the temperature of the heatable roller. However, in those treatment processes which require a highly accurate heat control, occasional excessive drops or variations of temperature cannot be tolerated.

The heat treatment apparatus known from U.S. Pat. No. 5,073,221, U.S. Pat. No. 5,124,756, DE 39 32 963 A1 and EP 0 538 809 A2 comprise two treatment stations provided as a pair of heating pressure rollers. In these known apparatus, each roller is provided with an individual heating means, making the overall apparatus unfavorably complicated. It is an object of the invention to provide a method for controlling the heating of two treatment devices of a heat treatment apparatus, and an apparatus controlled according to said method, in particular to provide a method for controlling the heating of the pair of laminating rollers of a laminating device and a laminating device for color proofing systems working according to said method, wherein, with low technical and constructional complexity, one heating means which directly heats only one treatment device can be used for heating also the other treatment device, while making highly efficient use of the energy applied for the heating of both treatment devices.

SUMMARY OF THE INVENTION

According to a first variant of the invention, a method is described wherein 1) the first treatment device is heated by a heating means and the second treatment device is heated while contacting the first treatment device, 2) the actual temperatures of the two treatment devices are detected, 3) with the treatment devices being spaced apart from each other, the first treatment device is heated by the heating means to a temperature which is, by a specific value, higher than a first desired temperature or is equal to a first desired temperature, and/or the first treatment device is maintained at such a temperature, 4) with the treatment devices being spaced apart from each other, it is detected whether the actual temperature of the second treatment device is lower than a second desired temperature being below the first desired temperature, and, if this is the case, the two treatment devices are brought in contact with each other, with the treatment devices contacting each other, the first treatment device is heated and/or its actual temperature is increased by the heating means until the actual temperature of the second treatment device is by a specific value higher than the second desired temperature or is equal to the second desired temperature, and, if this is the case, 5) the two treatment devices are returned into their mutually spaced relationship and the process is continued with step 4).

According to the invention, the apparatus for performing the above method comprises a heating means for heating a first treatment device provided for engagement with a first side of the element to be subjected to heat treatment, a second treatment device provided for engagement with a second side of the element to be subjected to heat treatment, a first temperature measurement device for detecting the actual temperature of the first treatment device and a second temperature measurement device for detecting the actual temperature of the second treatment device a temperature control device connected to the first temperature measurement device, for controlling the heating means to maintain the temperature of the first treatment device at a first desired temperature or within a predetermined temperature range above a first desired temperature, a transport drive means for moving at least one of the two treatment devices from a spaced-apart position in which the two treatment devices are arranged at a mutual distance, to a contact position in which the two treatment devices contact each other, a control device connected to the second temperature measurement device, for controlling the transport drive means and the temperature control device, wherein, with the treatment devices being in the spaced-apart position, the control device, if the actual temperature of the second treatment device is lower than a second desired temperature which in turn is below the first desired temperature, controls the transport drive means to move the treatment devices into the contact position, controls the heating means to heat the first treatment device to at least an actual temperature which is higher than the first desired temperature or is higher than said predetermined temperature range above the first desired temperature, until the actual temperature of the second treatment device is by a specific value higher than the second desired temperature or is equal to the second desired temperature, and thereafter finishes the controlling of the heating means and controls the transport drive means to move the treatment devices into the spaced apart position.

DETAILED DESCRIPTION OF THE INVENTION

Figure 1:
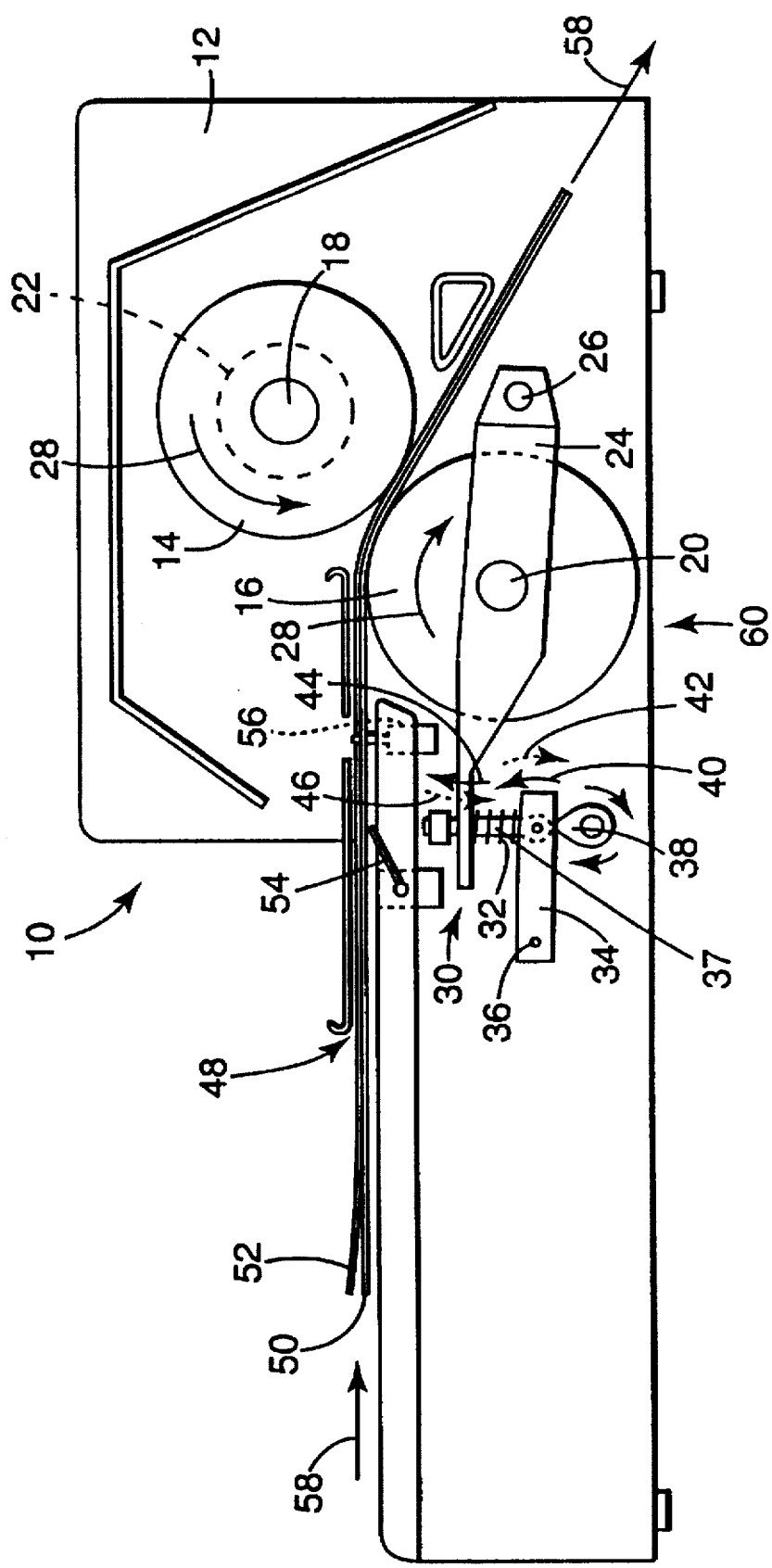
FIG. 1 is a side view of a laminating device for a color proofing system.

According to the invention, in tempering (adjusting the temperature of) the treatment devices which are engaged with both sides of an element to be subjected to heat treatment, only the treatment device associated with one side of the element to be subjected to heat treatment is heated by a heating means, while the treatment device associated with the other side of the said element is heated and is substantially maintained at its operating temperature without an additional heating means provided for that purpose. Thus, according to the invention, the heating means heats only one treatment device; the other treatment device is indirectly heated by being engaged from time to time with the treatment device heated by the heating means. If the actual temperature of that treatment device which is not directly heated by the heating means (to be referred to as the second treatment device hereunder) drops below its operating temperature (the second desired temperature), this treatment device is brought into engaging contact with the first treatment device which is directly heated by the heating means. Thus, thermal energy is transferred from the first treatment device to the second treatment device so that the latter is heated. If the two treatment devices do not contact each other, the temperature of the first treatment device is controlled in such a manner that it is always larger than or equal to a first desired temperature (the operating temperature of the first treatment device). If, however, the two treatment devices contact each other, which according the invention is provided for tempering the second treatment device, a heat loss of the first treatment device is precluded in that, simultaneously with the mutual contacting of the two treatment devices (or a short time earlier or afterwards), the heating means is switched on, irrespective of whether or not the first treatment device is at least at its desired temperature (operating temperature). If, without mutual contact of the treatment devices, the heating means would be switched on at an actual temperature of the first treatment device higher than the first desired temperature, the first treatment device would be excessively heated. When, however, the treatment devices are in contact with each other, the heating means will practically heat two treatment devices, so that an increased heating of the first treatment device is hardly or not at all observed because of the thermal energy drained off to the second treatment device. If, with the treatment devices contacting each other, activation of the heating means would be put off until the first treatment device would reach an actual temperature lower than its desired temperature, the delay time caused by the dead time behavior of the system could result in an intolerable drop of the actual temperatures of one or both treatment devices. The two treatment devices are returned into their mutually spaced positions only when the actual temperature of the second treatment device, which is only indirectly heated by the heating means, is again equal to or above the predetermined operating temperature (the second desired temperature).

It is an essential aspect of the invention that, during the warm-up phases of the second treatment device during which the two treatment devices are in mutual contact, the temperature control for maintaining the actual temperature of the first treatment device on the predetermined operating temperature (the first desired temperature), is suspended. The term "suspension" is to be understood in the sense that the heating of the first treatment device is not performed in dependence on the difference from the first desired temperature anymore, i.e. is not temperature-controlled anymore or is temperature-controlled on the basis of a higher desired temperature than in the case that the two treatment devices are not in contact with each other.

When, within the description of the invention, it is mentioned that the actual temperature of a treatment device is controlled to be at least equal to the predetermined desired or operating temperature, this means that the actual temperature is either equal to the desired temperature or is maintained within a range of temperatures of which the lower limit value is equal to the desired temperature. The extent of this range of temperatures depends on the thermal behavior of the treatment device and that of the overall heat treatment apparatus. This controlling process can be performed, e.g., by a two-position control or generally by some other type of control. When using a two-position control, it has to be safeguarded that the actual temperatures of the two treatment devices are within a range of operating temperatures. The temperature control of the second treatment device is basically a two-position control because the second treatment device is not heated continuously but discontinuously. The temperature control of the first treatment device need not necessarily be a two-position control. Suitably, however, a two-position control is used also for this treatment device.

Thus, according to the invention, the second treatment device, which is not heated directly, is temporarily brought into engaging contact or pressing contact with the directly heated first treatment device to provide a direct heat transfer from the first treatment device to the second treatment device through this contact. Of the heat treatment devices explained here, the first treatment device has a higher operating temperature than the second treatment device. The operating temperature of the first treatment device can be twice to three times as high (e.g., relative to 0° C. or room temperature, e.g., 20° C.) as the operating temperature of the second treatment device.

According to a second variant of the invention, a method is described wherein 1) the first -treatment device is heated by a heating means and the second treatment device is heated while contacting the first treatment device, 2) the actual temperatures of the two treatment devices are detected, 3) with the treatment devices being spaced apart from each other, the first treatment device is heated by the heating means to a temperature which is by a specific value higher than a first desired temperature or is equal to a first desired temperature corresponding to a first preset temperature value, and/or the first treatment device is maintained at such a temperature, 4) with the treatment devices being spaced apart from each other, it is detected whether the actual temperature of the second treatment device is lower than a second desired temperature being below the first preset temperature value for the first desired temperature, and, if this is the case, the two treatment devices are brought in contact with each other, the first desired temperature is set to a second preset temperature value which is higher than the first preset temperature value, with the treatment devices contacting each other, the first treatment device is heated by the heating means to a temperature being by a predetermined value higher than the new first desired temperature or being equal to the new first desired temperature, and/or is maintained at such a temperature, until the actual temperature of the second treatment device is by a predetermined value higher than the second desired temperature or is equal to the second desired temperature, and, if this is the case, 5) the two treatment devices are returned into their mutually spaced relationship, the first desired temperature is set again to the first preset temperature value, and the process is continued with step 4).

The apparatus for performing the above alternative of the method of the invention comprises a heating means for heating a first treatment device provided for engagement with a first side of the element to be subjected to heat treatment, a second treatment device provided for engagement with a second side of the element to be subjected to heat treatment, a first temperature measurement device for detecting the actual temperature of the first treatment device and a second temperature measurement device for detecting the actual temperature of the second treatment device, a temperature control device connected to the first temperature measurement device, for controlling the heating means to maintain the temperature of the first treatment device at or within a predetermined temperature range above a first desired temperature corresponding to a first preset temperature value, a transport drive means for moving at least one of the two treatment devices from a spaced-apart position in which the two treatment devices are arranged at a mutual distance, to a contact position in which the two treatment devices contact each other, a control device connected to the second temperature measurement device, for controlling the transport drive means and the temperature control device, wherein, with the treatment devices being in the spaced-apart position, the control device, if the actual temperature of the second treatment device is lower than a second desired temperature which in turn is below the first preset temperature value for the first desired temperature, controls the transport drive means to move the treatment devices into the contact position, controls the temperature control device to change the first desired temperature to a second preset temperature value which is higher than the first preset temperature value, wherein the temperature control device controls the heating means to heat the first treatment device to an actual temperature which is by a predetermined value higher than the new first desired temperature or is equal to the new first desired temperature, or to maintain the first treatment device at said actual temperature, until the actual temperature of the second treatment device is by a specific value higher than the second desired temperature or is equal to the second desired temperature, and, thereafter finishes the controlling of the heating means, controls the temperature control device to change the first desired temperature to the first preset temperature value and controls the transport drive means to move the treatment devices into the spaced-apart position.

In the above second variant of the invention, it is provided that in those phases in which the two treatment devices contact each other, the desired temperature of the first treatment device is set to a higher value than in the other phases. Thereby, it is accomplished that the heating means is switched on in any case and, thus, the thermal balance of the pair of treatment devices is adapted to the new situation (the contact of the two treatment devices). This provision does not yet constitute a difference from the above first alternative; the difference between the two alternatives resides in that, also in the contacting state of the two treatment devices, the heating device for the first treatment device is activated in dependence on whether the actual temperature of the first treatment device is above or below a (now increased) preset value, or in case of a continuous control with adjustable capacity of the heating means on the extent to which the temperature deviates from the preset value. In the second variant, an overheating of the first treatment device is prevented since the heating means will be switched off when the increased first desired temperature is exceeded. The mount of the increased preset value for the first desired temperature is to be selected in dependence on the thermal properties of the two treatment devices and the overall heat treatment apparatus.

According to a third variant of the invention, a method is described wherein 1) the first treatment device is heated by a heating means and the second treatment device is heated while contacting the first treatment device, 2) the actual temperatures of the two treatment devices are detected, 3) with the treatment devices being spaced apart from each other, the first treatment device is heated by the heating means to a temperature which is by a specific value higher than a first desired temperature or is equal to a first desired temperature corresponding to a first preset temperature value, and/or the first treatment device is maintained at such a temperature, 4) with the treatment devices being spaced apart from each other, it is detected whether the actual temperature of the second treatment device is within a predetermined temperature range which is lower than a second desired temperature being below the first preset temperature value for the first desired temperature, and, if this is the case, the first desired temperature is set to a second preset temperature value which is higher than the first preset temperature value, the two treatment devices are brought in contact with each other when the actual temperature of the second treatment device has dropped below said predetermined temperature range which is lower than the second desired temperature, with the treatment devices contacting each other, the first treatment device is heated by the heating means to a temperature being by a predetermined value higher than the new first desired temperature or being equal to the new first desired temperature, and/or is maintained at such a temperature, until the actual temperature of the second treatment device is by a predetermined value higher than the second desired temperature or is equal to the second desired temperature, and, if this is the case, 5) the two treatment devices are returned into their mutually spaced relationship, the first desired temperature is set again to the first preset temperature value, and the process is continued with step 4).

For carrying out the above third variant of the method of the invention, an apparatus is proposed which comprises a heating means for heating a first treatment device provided for engagement with a first side of the element to be subjected to heat treatment, a second treatment device provided for engagement with a second side of the dement to be subjected to heat treatment, a first temperature measurement device for detecting the actual temperature of the first treatment device and a second temperature measurement device for detecting the actual temperature of the second treatment device, a temperature control device connected to the first temperature measurement device, for controlling the heating means to maintain the temperature of the first treatment device on or within a predetermined temperature range above a first desired temperature corresponding to a first preset temperature value, a transport drive means for moving at least one of the two treatment devices from a spaced-apart position in which the two treatment devices are arranged at a mutual distance, to a contact position in which the two treatment devices contact each other, a control device connected to the second temperature measurement device, for controlling the transport drive means and the temperature control device, wherein, with the treatment devices being in the spaced-apart position, the control device, if the actual temperature of the second treatment device is within a predetermined temperature range of which the upper limit value is a second desired temperature which in turn is below the first preset temperature value for the first desired temperature, controls the temperature control device to change the first desired temperature to a second preset temperature value which is higher than the first preset temperature value, controls the transport drive means to move the treatment devices into the contact position when the actual temperature of the second treatment device has dropped below said predetermined range of temperatures, wherein the temperature control device controls the heating means to heat the first treatment device to an actual temperature which is by a predetermined value higher than the new first desired temperature or is equal to the new first desired temperature, or to maintain the first treatment device at said actual temperature, until the actual temperature of the second treatment device is by a specific value higher than the second desired temperature or is equal to the second desired temperature, and, thereafter finishes the controlling of the heating means, controls the temperature control device to change the first desired temperature to the first preset temperature value and controls the transport drive means to move the treatment devices into the spaced-apart position.

According to the above third variant of the invention, its is detected whether or not the actual temperature of the second treatment device is within a predetermined range of temperatures of which the upper limit is defined by the second desired temperature. Already at the time this state is detected, the heating means for heating the first treatment device will be switched on. This is a preparatory measure by which the thermal balance of the first treatment device is readied for the oncoming contacting between the two treatment devices and the resultant heat transfer from the first to the second treatment device. If the actual temperature of the second treatment device subsequently further drops until reaching a value below the predetermined range of temperatures, the two treatment devices will be contacted to heat the second treatment device. In this variant of the invention, it is basically possible that, in the heating phase of the first treatment device during which this device is to be "prepared" for the imminent contacting between the two treatment devices, the heating process is performed without temperature control. However, to preclude overheating of the first treatment device, it is advisable that as in the second variant of the invention the desired temperature of the first treatment device be set to a higher maximum value so that, by switching off the heating means when the maximum temperature is exceeded, the first treatment device will not be overheated. The third variant of the invention offers the advantage that the first treatment device is preheated in preparation to its oncoming contact with the second treatment device, so that the occurring differences in temperature are reduced.

Suitably, if the heating phase of the pair of treatment devices is performed after a relatively long standstill time in which both treatment devices have cooled down considerably, both treatment devices are brought in contact with each other and the desired temperature for the first treatment device is set to the increased preset value. Then, as soon as the operating or desired temperature for the second treatment device has been reached, the two treatment devices are removed from each other. Simultaneously, the first desired temperature, i.e. the desired temperature for the first treatment device, is reset to the lower preset value. Since, as already described above, the operating temperature of the first treatment device is normally higher than the operating temperature of the second treatment device, the first treatment device will then be further heated until reaching the first desired temperature. Should the actual temperature of the second treatment device have dropped below its desired temperature when the above condition is reached, there will be performed the same process which has been described in connection with the above explained alternatives.

For shortening the warm-up phase, it is useful to provide that the first desired temperature which for healing the two contacting treatment devices has been set to the increased preset value—is maintained when the second treatment device has reached its desired temperature and the two treatment devices are moved away from each other. Thus, the further heating of the first treatment device is performed with the higher preset value for the first desired temperature.

This approach is useful especially if the heating capacity of the heating means is controllable and can be adjusted in dependence from the amount of the difference between the actual temperature and the desired temperature. If, however, the heating apparatus is practically operated in the conditions "on" and "off" without changing the heating capacity in the on-condition, an increased preset value for the first desired temperature will not have any effect on the shortening of the warm-up time under the above mentioned conditions.

Suitably, a feeding movement of the element to be subjected to heat treatment between the treatment devices should be prevented in those phases in which both treatment devices contact each other for (indirect) heating of the second treatment device. The feeding of the element to be subjected to heat treatment can take place only when the second treatment device has reached its operating temperature (desired temperature).

Thus, according to the invention, the tempering of both treatment devices of a heat treatment apparatus requires only a sole heating means for tempering both treatment devices. It is merely required to use a sufficiently smart electronic system by which the transport drive means in heat treatment apparatus of the presently discussed type is controlled from time to time to effect a contact between both treatment devices, allowing to influence the temperature of that treatment device which is not directly heated by the heating means. By using only one heating means for heating a heat treatment device, the constructional complexity and the manufacturing costs are reduced. In heat treatment apparatus of the instant type, especially the surface temperature of the treatment devices has to be controlled. By the engaging contact of the two treatment devices, exactly this surface temperature of the treatment device not directly heated by the heating means is quickly and efficiently controlled to the required minimum temperature (the second desired temperature). Further, also the required nominal capacity of the overall heat treatment apparatus is reduced because a heating means need be provided for only one treatment device.

The invention will be explained in greater detail hereunder with reference to the accompanying drawings in connection with a heat treatment apparatus provided as a laminating device for color proofing systems.

FIG. 1 is a side view of a laminating device 10 as used, e.g., for the color proofing systems in the field of graphic reproduction and printing. Laminating device 10 is provided with a housing 12 which, among others, accommodates a pair of laminating rollers comprising an upper laminating roller 14 and a lower laminating roller 16. Both laminating rollers 14, 16 are rotatable around parallel axes 18, 20, with upper laminating roller 14 being supported on housing 12. Upper laminating roller 14 is provided with an (internal) heating means 22 serving for direct heating of upper laminating roller 14. Lower laminating roller 16 is not provided with a heating means.

The rotational axis 20 of lower laminating roller 16 has its axial ends supported on respective pivot arms 24 which radially project beyond lower laminating roller 16 in outward direction and are mounted to be pivoted on housing 12. Said pivot arms 24 on housing 12 are pivotable about pivot axes 26 which in turn extend in parallel to the rotational axes 18, 20 of laminating rollers 14, 16. By pivoting the pivot arms 24, lower laminating roller 16 can be moved away from upper laminating roller 14 or be moved into engaging contact with upper laminating roller 14. Both laminating rollers 14, 16 can be rotatably driven in the direction of arrows 28 by a chain drive (not shown).

The pivot arms 24, on their free ends 30 facing away from pivot axes 26, are engaged by compression springs 32 which are supported, on the one hand, on the free ends 30 of pivot arms 24 and, on the other hand, on pivotable levers 34. Said levers 34 are supported to be pivoted about pivoting axes 36 on housing 12, which in turn extend in parallel to pivot axes 26 and rotational axes 18,20. The levers 34 are further provided with pins 37 which have the compression springs 32 arranged therearound and which are guided through the free ends 30 of pivot arms 24 while being secured against undesirably sliding out of these free ends 30. The sides of levers 34 facing away from compression springs 32 are in engagement with the peripheral faces of cam members 38 which can be rotatably driven by a rotary drive (not shown). Upon rotation of cam members 38, levers 34 are pivoted in the direction of arrow 40 in FIG. 1 or because of the free ends 30 of pivot arms 24 resting on levers 34 are pivoted in the direction of arrow 42, depending on the rotational position of cam members 38. When the pivoting movement is performed in the direction of arrow 40, pivot arms 24 are pivoted in the direction of arrow 44, and when levers 34 are pivoted back in the direction of arrow 42, pivot arms 24 are pivoted in the direction of arrow 46. Because of the mechanical coupling between respectively one lever 34 and the pivot arm 24 associated thereto, the laminating rollers 14, 16 are pressed against each other with a pressing force determined by compression springs 32 so that their peripheral surfaces are pressed against each other by a defined force.

The intermediate space between the two laminating rollers 14, 16 has a feed path 48 entering thereinto which serves for infeed of a proof of 50 covered by a color particle layer 52. By the heating of proof 50 and color particle layer 52 and by the above pressing force, color particle layer 52, itself being held by a carrier film, is laminated onto proof 50. When the laminate applied on proof 50 and color particle layer 52 (including the carrier film) has left laminating device 10, the carrier layer can be pulled off so that the proof 50 will then carry only the color particle layer 52 which is to be exposed subsequently. Within feed path 48, a sensor 54 and a stopper means 56 are provided. Sensor 54, which in the transport direction 58 is arranged before stopper means 56, detects whether or not a proof 50 to be laminated is supplied. Stopper means 56 is provided to prevent infeed of proof 50 into the space between the two laminating rollers 14, 16 in those phases in which both laminating rollers 14, 16 are in mutual contact for tempering the lower laminating roller 16 which is not directly heated by heating means 22.

Figure 2:
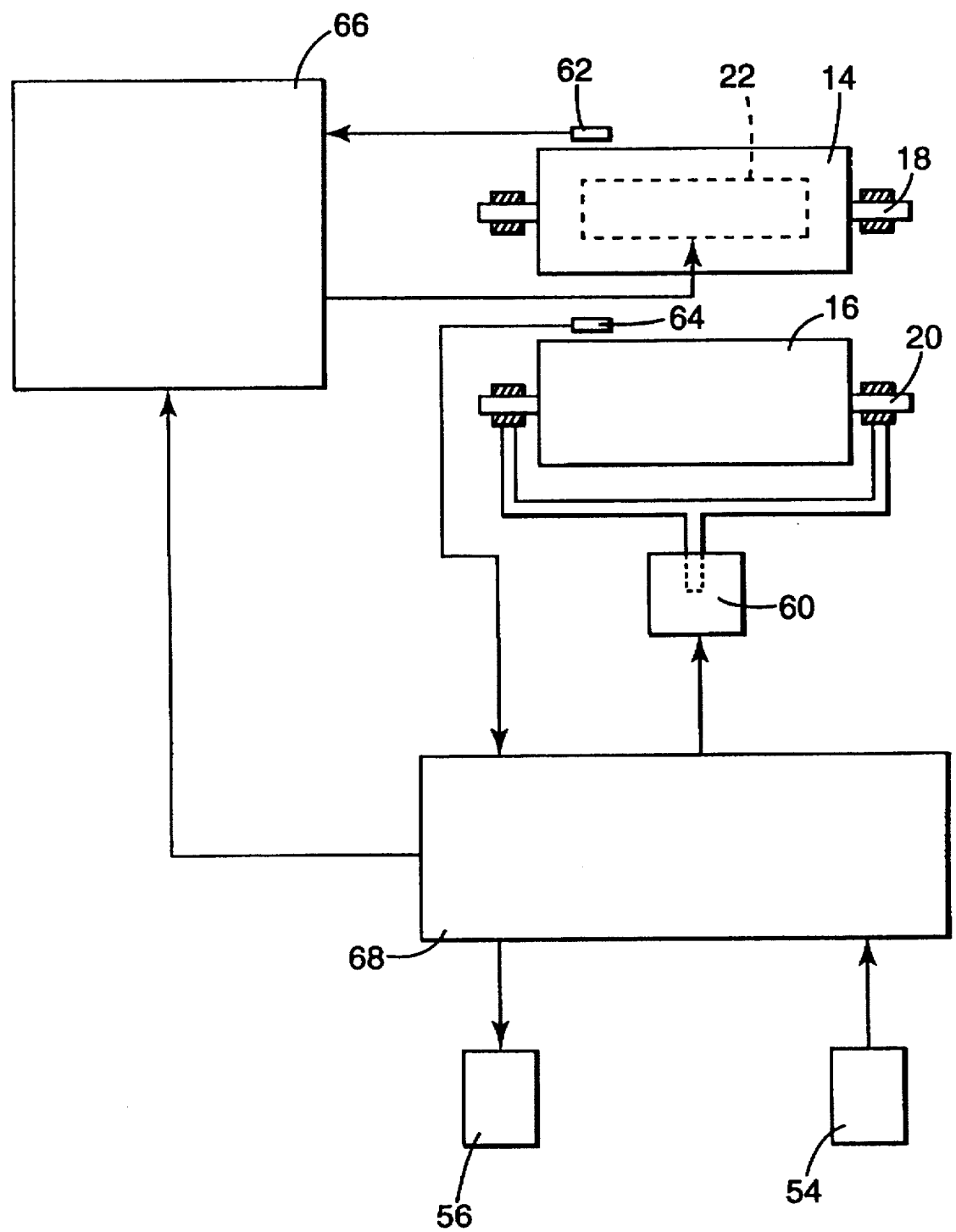
FIG. 2 is a block diagram of the temperature control system for the two laminating rollers of the laminating device of FIG. 1.

FIG. 2 shows a block diagram for explaining the control of the surface temperature of both laminating rollers 14, 16. The transport drive means for bringing lower laminating roller 16 in engagement with upper laminating roller 14 and into a position spaced from upper laminating roller 14, is shown at 60 in FIG. 2 and will be explained in detail with reference to FIG. 1. The surface temperature of both laminating rollers 14, 16 is detected by temperature sensors 62, 64. A temperature control device 66 receives an input signal representing the actual temperature of upper laminating roller 14 from temperature sensor 62. Depending on whether the actual temperature $T_1$ of upper laminating roller 14 has reached at least a predetermined (first) desired temperature $T_{1S1}$ or lies within a first desired temperature range $T_{1S1}$ heating means 22 is controlled by temperature control device 66. The controlling of the temperature is simplified if heating means 22 can only be switched on or off by temperature control device 66. In this case, a two-position control is performed, providing that the actual temperature of upper laminating roller 14 on the surface thereof is within a (first) desired temperature range.

Also the actual temperature $T_2$ on the surface of lower laminating roller 16 is detected, which is performed by temperature sensor 64. Temperature sensor 64, however, is connected to a control device 68 which, in dependence on the output signal of temperature sensor 64 representing the actual temperature $T_2$, controls transport drive means 60, stopper means 56 and temperature control device 66. Further, sensor 54 in feed path 48 emits a signal to control device 68 for indicating the presence or absence of a proof 50 in feed path 48.

In the normal condition of laminating device 10, both laminating rollers 14, 16 are arranged at a distance from each other and the actual temperature of upper laminating roller 14 is controlled through two-position control by temperature control device 66. For performing a laminating process, the temperature of upper laminating roller 14 should be about 132° C. (±1° C.) and that of lower laminating roller 16 should be about 50° C. (±5° C.). If the actual temperature of upper laminating roller 14 drops below the predetermined first desired temperature range, i.e. the low first desired temperature of 132° C., temperature control device 66 will switch on heating means 22 to heat upper laminating roller 14. If, on the other hand, the actual temperature of lower laminating roller 16 drops below a second desired temperature range, i.e. below 50° C., control device 68 causes the transport drive means to move lower laminating roller 16 against upper laminating roller 14 and simultaneously causes the temperature control device 66 to set the desired temperature range for upper laminating roller 14 to a higher value. For this purpose, the first desired temperature is increased to a value which is larger than the previous value of 132°, e.g., by 2°–5°, preferably 3°–4°. As a result, heating means 22 is switched on because, at that time, the actual temperature of upper laminating roller 14 is below the increased desired temperature range. In this manner, it is provided that, when the two laminating rollers 14, 16 are in contact with each other, heating means 22 is switched on to directly compensate the heat loss resulting from the heat radiation from upper laminating roller 14 to lower laminating roller 16. When lower laminating roller 16 has reached its desired temperature range, control device 68 will control transport drive means 60 to remove lower laminating roller 16 from upper laminating roller 14. Further, control device 68 controls temperature control device 66 in such a manner that the desired temperature range for upper laminating roller 14 defined by temperature control device 66 will again be the lower desired temperature range. Additionally, control device 68 controls stopper means 56 to clear feed path 48 again. Thus, when sensor 54 now signals the infeed of a proof to be laminated and lower laminating roller 16 is in the retracted state relative to upper laminating roller 14—which is detected, e.g., by the fact that stopper means 56 is controlled to clear feed path 48, control device 68 causes transport drive means 60 to move lower laminating roller 16 against upper laminating roller 14. As an additional measure to prepare laminating device 10 for a laminating process, it can be provided that, when sensor 54 is responding, control device 68 will cause temperature control device 66 to switch heating means 22 into the on-state for the oncoming laminating process. This can be done directly or indirectly by increasing the desired temperature range for upper laminating roller 14. As soon as sensor 54 does not detect a proof anymore, i.e. when the laminating process is coming to an end, control device 68 e.g., with a certain time delay will control transport drive means 60 for withdrawing lower laminating roller 16. If, during this process, it is detected that the actual temperature of lower laminating roller 16 has dropped below its desired temperature range, the two laminating rollers 14, 16 remain in mutual contact. The laminating rollers 14, 16 will be separated from each other only when the actual temperature of lower laminating roller 16 is in the desired temperature range. This manner of controlling corresponds to the already described procedure for tempering lower laminating roller 16.

Figure 3:
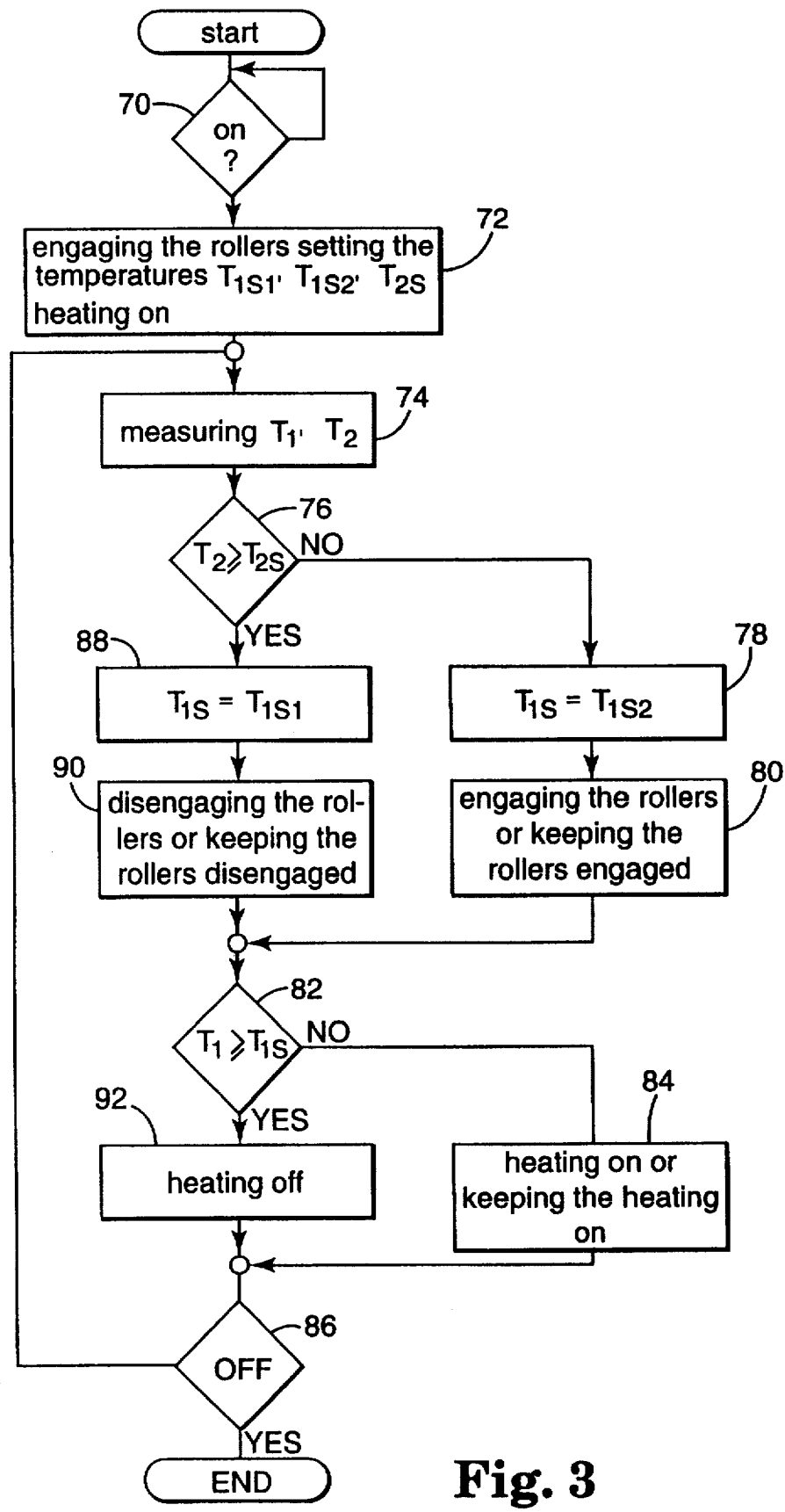
FIG. 3 is a flow chart for explaining the temperature control of the two laminating rollers of the laminating device of FIG. 1.

The control procedure will be briefly discussed hereunder with reference to FIG. 3. After switch-on of laminating device 10, which is detected in step 70, an initialization phase will be performed in step 72 in which the two laminating rollers 14,16 are contacted with each other and the desired temperatures or the desired temperature ranges $T_{1S1}$ $T_{1S2}$ and $T_{2S}$ for the two laminating rollers 14, 16 are set. Then, the process is continued with step 74 in which the actual temperatures $T_1$ and $T_2$ for upper laminating roller 14 and lower laminating roller 16 are measured. Then, in step 76, an interrogation is made for examining whether the actual temperature $T_2$ of lower laminating roller 16 is higher than the desired temperature $T_{2S}$ for this laminating roller. If this is not the case, which can be assumed when switching on the device, then, in step 78, the desired temperature for upper laminating roller 14 is set to the higher one of the two desired temperatures $T_{1S2}$ to be set for this laminating roller. In step 80, the laminating rollers are moved into mutual contact, or, as in the case described here, maintained in mutual contact. The process is continued with step 82 in which it is checked whether the actual temperature $T_1$ for upper laminating roller 14 is larger than or equal to the current (in this example, higher) desired temperature. If this is not the case, which can be assumed after switching on the laminating device, the process is continued with step 84 in which heating means 22 is switched on or, if its has already been switched on in the initialization phase 42 and then has not yet been deactivated, is maintained in the switched-on state. Then, in step 86, it is detected whether or not laminating device 10 is switched off. If laminating device 10 is kept switched on, the process returns from step 86 to step 74 and the above procedure is repeated until the actual temperature of lower laminating roller 16 is below the predetermined desired temperature $T_{2S}$ and upper laminating roller 14 has an actual temperature which is lower than its desired temperature $T_{1S2}$ set to the increased value.

As soon as the actual temperature of lower laminating roller 16 has reached the desired temperature $T_{2S}$ of roller 16, the process proceeds from this interrogation step 76 to step 88 in which the desired temperature of upper laminating roller 14 is set to the lower preset value $T_{1S1}$. Subsequently, laminating rollers 14, 16 are brought into mutually spaced relationship in step 90. The above decrease of the preset value for the desired temperature of upper laminating roller 14 in step 88 is suitable because, in the spaced condition of laminating rollers 14, 16, the directly heated upper laminating roller 14 need no longer be heated at a higher intensity than required for a laminating process since an undesired heat loss due to contact between the two laminating roller is not to be expected and the lower laminating roller 16 need not be heated any longer. After step 90, it is checked once more in step 82 whether the actual temperature of upper laminating roller 14 is at least equal to the now lower desired temperature $T_{1S1}$. Should this not be the case, heating means 22 is kept in the switched-on condition (step 84). Then, step 86, i.e. the detection whether or not laminating device 10 is switched off, is continued, and then the process returns to step 74 while laminating device 10 is kept in the switched-on condition.

If, during the control process, it is detected in step 82 that, in the disengaged condition of laminating rollers 14, 16, the actual temperature of upper laminating roller 14 is higher than or equal to the lower desired temperature $T_{1S1}$ of roller 14 (rollers 14, 16 are kept spaced apart from each other, for which reason the desired temperature has been set to the lower preset value at an earlier time in step 88), the process proceeds from step 82 to step 92 in which heating means 22 is switched off.

To sum up, the above described inventive temperature control of the two laminating rollers 14, 16 presents a solution which is simple in construction and requires only little power expenditure because, on the one hand, a heating means is required for only one laminating roller and the temperature for the other laminating roller is realized by contacting this second laminating roller with the first one, and, on the other hand, no additional constructional measures are necessitated. In the heat treatment apparatus discussed here, suitable transport drive means are provided to move the two treatment devices (laminating rollers) into mutual contact and to remove them from each other.

We claim:

1. A method for controlling the temperatures of a first heatable treatment device and a second heatable treatment device adapted to be brought into mutual contact and into a mutually spaced relationship, the first heatable treatment device having a heating means, the method comprising the steps of:

measuring an actual temperature of the first heatable treatment device and an actual temperature of the second heatable treatment device;

activating the heating means of the first heatable treatment device when the actual temperature of the first heatable treatment device is below a first desired temperature range, thereby heating the first heatable treatment device;

engaging the first heatable treatment device and the second heatable treatment device into mutual contact when the actual temperature of the second heatable treatment device is below a second desired temperature range, thereby radiating heat from the first heatable treatment device to the second heatable treatment device;

disengaging the first heatable treatment device and the second heatable treatment device into a mutually spaced relationship when the actual temperature of the second heatable treatment device is at least within the second desired temperature range; and deactivating the heating means of the first heatable treatment device when the actual temperature of the first heatable treatment device is at least within the first desired temperature range.

2. The method of claim 1 wherein the engaging step comprises the step of increasing the first desired temperature range by a predetermined temperature value, thereby compensating for heat radiated from the first heatable treatment device to the second heatable treatment device, and further wherein the disengaging step comprises the step of decreasing the first desired temperature range by the predetermined temperature value.

3. The method of claim 1 wherein the engaging step brings the first heatable treatment device and the second heatable treatment device into mutual contact such that an element subject to heat treatment can be passed between the first heatable treatment device and the second heatable treatment device.

4. The method of claim 1 wherein the first heatable treatment device is a laminating roller and the second heatable treatment device is a laminating roller.

5. In a laminating device having a first laminating roller and a second laminating roller adapted to be brought into mutual contact and into a mutually spaced relationship, the first laminating roller including a heating means, a method for controlling the temperatures of the first laminating roller and the second laminating roller comprising the steps of:

measuring an actual temperature of the laminating roller and an actual temperature of the second laminating roller;

activating the heating means of the first laminating roller when the actual temperature of the first laminating roller is below a first desired temperature range, thereby heating the first laminating roller;

engaging the first laminating roller and the second laminating roller into mutual contact when the actual temperature of the second laminating roller is below a second desired temperature range, thereby radiating heat from the first laminating roller to the second laminating roller;

disengaging the first laminating roller and the second laminating roller into a mutually spaced relationship when actual temperature of the second laminating roller is at least within the second desired temperature range; and deactivating the heating means of the first laminating roller when the actual temperature of the first laminating roller is at least within the first desired temperature range.

6. The method of claim 5 further comprising the steps of:

upon detecting a sheet to be laminated, engaging the first laminating roller and the second laminating roller into mutual contact such that the sheet can be passed between the first laminating roller and the second laminating roller; and maintaining the first laminating roller and the second laminating roller in mutual contact after the sheet is laminated when the actual temperature of the second laminating roller is below the second desired temperature range, thereby radiating heat from the first laminating roller to the second laminating roller.

7. The method of claim 5 wherein the engaging step comprises the step of increasing the first desired temperature range by a predetermined temperature value, thereby compensating for heat radiated from the first laminating roller to the second laminating roller, and further wherein the disengaging step comprises the step of decreasing the first desired temperature range by the predetermined temperature value.

8. The method of claim 6 wherein the maintaining step comprises the step of increasing the first desired temperature range by a predetermined temperature value, thereby compensating for heat radiated from the first laminating roller to the second laminating roller, and further wherein the disengaging step comprises the step of decreasing the first desired temperature range by the predetermined temperature value.

* * * * *